United States Patent [19]

Ekstrand

[11] Patent Number: 4,814,966
[45] Date of Patent: Mar. 21, 1989

[54] SHUNT SWITCHED RESISTOR REGULATOR WITH DIODE SNUBBER

[75] Inventor: John Ekstrand, Palo Alto, Calif.

[73] Assignee: Spectra-Physics, Inc., San Jose, Calif.

[21] Appl. No.: 103,095

[22] Filed: Sep. 30, 1987

Related U.S. Application Data

[63] Continuation-in-part of Ser. No. 945,924, Dec. 23, 1986, Pat. No. 4,719,404, which is a continuation-in-part of Ser. No. 754,036, Jul. 11, 1985, Pat. No. 4,668,906.

[51] Int. Cl.$^4$ ................................................ G05F 1/46
[52] U.S. Cl. ...................................... 363/89; 323/233; 323/266; 323/297; 323/354
[58] Field of Search ................ 323/233, 266, 275, 293, 323/297, 352-354, 222, 224; 363/84, 86, 89

[56] References Cited

U.S. PATENT DOCUMENTS

4,011,497  3/1977  Nercessian ........................ 323/266
4,270,166  5/1981  Immler ............................... 363/89

Primary Examiner—Peter S. Wong
Attorney, Agent, or Firm—Ciotti & Murashige, Irell & Manella

[57] ABSTRACT

There is disclosed a diode snubber for the voltage transients generated in the parasitic inductance of a switched resistor when current therethrough is interrupted. Also disclosed is the use of such a diode snubber in: a series switched resistor regulator; a shunt switched resistor regulator; a hybrid switched resistor regulator and a passbank switched resistor regulator. Also disclosed is the use of a linear dissipative regulator in all these forms of switched resistor regulators to maximize the efficiency of power delivery to the load.

15 Claims, 3 Drawing Sheets

SHUNT SWITCHED RESISTOR REGULATOR WITH DIODE SNUBBER

RELATED APPLICATIONS

This application is a continuation-in-part application of a U.S. patent application entitled "Switched Resistor Regulator With Linear Dissipative Regulator," Ser. No. 945,924, filed Dec. 23, 1986, now U.S. Pat. No. 4,719,404 which was a continuation-in-part application of a U.S. patent application entitled "Switched Resistor Regulator," Ser. No. 754,036, filed July 11, 1985, now U.S. Pat. No. 4,668,906, both of which are hereby incorporated by reference.

BACKGROUND OF THE INVENTION

The invention relates generally to power supplies, and, more specifically, to regulated power supplies using switched resistors having parasitic inductance.

One particular application for regulated power supplies is supplying power to ion lasers. Important factors for such power supplies are weight, speed, simplicity, reliability and radio frequency emissions.

U.S. patent application Ser. No. 754,036, filed July 11, 1985, describes a dissipative switched resistor regulator in which current flow through a resistor which is electrically connected to a load is controlled by varying the duty cycle of a switch which switches the resistor into and out of the circuit between a power source and the load; the resistor may be in series with or in parallel with the load. However, since there is always a series resistance between the source and the load when the switch is closed (for the series switched resistor regulator configurations), there is a minimum voltage drop which cannot be avoided even when the duty cycle is 100%. This unwanted lost power in the switched resistor results in poor efficiency. Also, the full source voltage cannot be applied to the load because of the voltage drop across the switched resistor when the duty cycle is 100%. The problem cannot be solved merely by decreasing the series resistance since this results in increased peak current through the switch which may exceed the capability of the switch to dissipate power. Also, decreased switched resistor resistance results in increased capacitor ripple currents.

The related U.S. patent application entitled, "Switched Resistor Regulator with Linear Dissipative Regulator", Ser. No. 945,924, filed Dec. 23, 1986 teaches a solution to this problem. The solution taught there is a linear dissipative regulator which bypasses the resistor and switch combination with a low resistance path when the duty cycle of the switch is 100%. This minimizes the power lost in the switched resistor during intervals when the duty cycle is 100%.

It has been found that the wire-wound resistors used for the switched resistor in some switched resistor regulator power supplies have parasitic inductance. This parasitic inductance causes voltage transients when current through the resistor is cut off. These voltage transients take the form of large voltage spikes which can damage switching transistors used to switch the resistors in and out of the circuit. Unless these voltage spikes are "snubbed", they can damage the switching transistors.

Designs for snubbers are well known. A simple design for a snubber is a capacitor which shunts the switching transistor. The capacitor acts as an initial short in passing the current of the voltage transient around the switch until the capacitor charges up. Such a design has the problem that the snubber capacitor charges up with the current in the transient spike. This charge must be bled off the snubber capacitor before the next cycle of the switch or the snubber capacitor will not be effective to snub the next transient. This bleeding off of charge occurs through the switch the next time the switch is turned on. This increases the electrical stress on the switch.

A lone capacitor cannot be used for the snubber without an additional series resistor. This is because the capacitor and the parasitic inductance together act as a tuned circuit and can oscillate or "ring". The addition of a series resistance sufficient to critically damp the circuit is necessary to suppress this ringing. However, this additional series resistance also slows down the process of charging and discharging the snubber capacitor. The slower charging tends to mitigate somewhat the effectiveness of the snubber. To regain the snubbing effectiveness, a diode is placed in parallel with the resistor such that the voltage transient will be of the proper polarity to forward bias the diode and charge the snubber capacitor through the diode. To protect the diode from being destroyed by excessive current, a small current-limiting resistor is placed in series with the diode. However, the diode is reverse biased during the discharge cycle to ready the snubber capacitor for the next transient, so discharging must occur through the series resistor. This slows the discharge rate and places a limitation on the maximum rate at which the switch may be operated since the next cycle cannot start until the snubber capacitor is fully discharged. A further disadvantage of the above-described prior art snubber design is that it is too complicated and expensive since it involves many components and many interconnections between them.

Accordingly, a need has arisen for a snubber design which is simple, effective, and inexpensive.

SUMMARY OF THE INVENTION

According to the teachings of the invention, there is taught the use of a diode snubber which is coupled across the switched resistor and its parasitic inductance. This flies in the face of teachings in the prior art to the effect that a diode cannot be used to snub an inductor. The reason for this is that the average voltage across a pure indicator must be zero and this cannot be true when a diode is placed across the inductor. Current would rise to infinite levels since L di/dt must be non-zero if the average voltage across the inductor is not zero. This would be the case with a diode snubber.

In a system built according to the teachings of the invention, the snubber diode is placed in a shunt connection across the switched resistor and its intrinsic parasitic inductance. The switched resistor resistive component limits the rise of current to infinite levels which would otherwise tend to occur if the switched resistor resistive component were not present.

DETAILED DESCRIPTION OF THE PREFERRED EMBODIMENTS

The invention is typically used in power supply regulators for regulating power from a supply means to a load by switching a resistor in and out of electrical connection between the voltage supply and a load using a controlled duty cycle. FIGS. 1-5 show different embodiments of switched resistor regulators using diode snubbers according to the teachings of the invention. To best understand the significance of the invention, a description of the various forms of switched resistor regulators is in order.

The switched resistor regulator (hereafter SRR) is primarily a current regulator since by switching the resistor in and out of the circuit, the current to the load is controlled; voltage regulation of the average voltage across the load automatically results. An output capacitor is also coupled to the load. The output capacitor is coupled either in parallel across the load or across a series-switched resistor. The purpose of this capacitor is to maintain current flow from stored charge in the capacitor when the resistor is switched out of the circuit. Regulation is accomplished by controlling dissipation of power in the resistor by controlling the duty cycle of the switch. A longer duty cycle causes more power dissipation in the resistor; thus regulation is produced by selectively introducing resistive losses in the circuit.

The circuits of FIGS. 1-5 also include linear dissipative regulators (hereafter sometimes called LDR) connected between the voltage source and the load. The linear dissipative regulators are coupled in parallel to the switched resistor in the series switched resistor regulator embodiments. In shunt-switched resistor regulator embodiments, the LDR is coupled to provide a shunt path around the current limiting, fixed series resistor during intervals when the switched resistor is switched out of the circuit (0% duty cycle). The linear dissipative regulator in each circuit is controlled to decrease the voltage drop between the source and the load during intervals when maximum power is to be delivered to the load.

In operation, the series-switched resistor regulator provides current regulation of average current from the power source to the load, with a small duty cycle providing lower average current through the load and a large duty cycle providing higher average current through the load. Lower average current through the load results from low duty cycles because higher average voltage drop across the SRR occurs. This means less average voltage drop occurs across the load and less current flows through the load as a result. However, at a 100% duty cycle, when the switch is always closed (in series embodiments), the switched resistor regulator is no longer regulating the current through the load, and the lowest voltage drop across the SRR is reached.

The shunt-switched regulator works in the opposite fashion. At low duty cycle, current draw through the shunt-switched resistor regulator is reduced and more current flows through the load. At high duty cycles, more current flows through the shunt-switched resistor regulator, and less current flows through the load. At 0% duty cycle, maximum current is delivered to the load. The magnitude of this maximum load current is limited by a fixed resistance series resistor. There is an unavoidable voltage drop across this series resistor. In order to further decrease the voltage drop between the power source and the load to maximize power delivered to the load, a parallel linear dissipative regulator is used. The parallel linear dissipative regulator reduces the voltage drop across the series current limiting resistor by shunting part of the current around the series resistance of the current limiting resistor. This increases the power to the load beyond that available from the switched resistor regulator alone.

The circuits of FIGS. 1-5 also contain diode snubbers. These snubbers serve to dissipate the energy in voltage transients which result when current is interrupted through the parasitic inductance that is associated with each switched resistor. A detailed analysis of how these diode snubbers work is given below.

Figure 1:
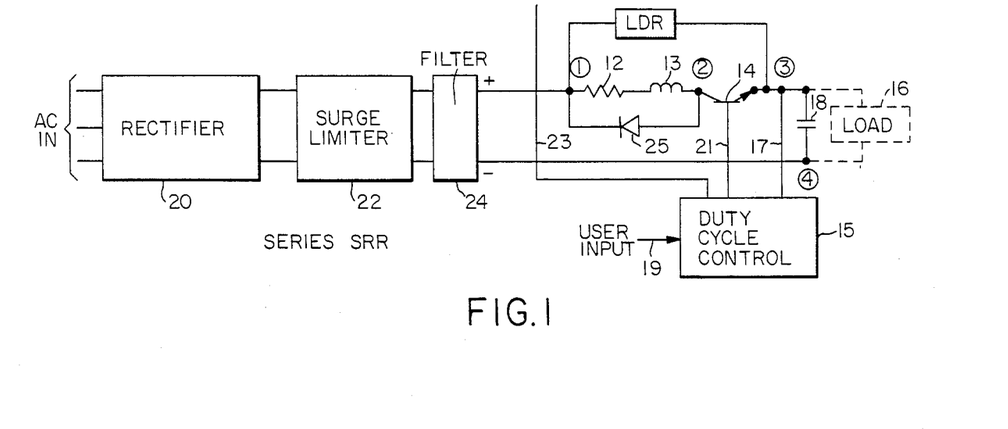
FIG. 1 is a schematic/block diagram of a series-switched resistor regulator with a linear dissipative regulator and with a diode snubber.

A series-switched resistor regulator 10, as shown in FIG. 1, has a fixed resistor 12 connected through a switch 14 to a load 16 and to a capacitor 18 which is connected in parallel across load 16, i.e., from node 3 to node 4. The resistor 12 is generally a wire-wound resistor of approximately 2 ohms resistance. This resistor has a parasitic inductance 13 associated with it. Together, the resistor 12 and its parasitic inductance couple node 1 to node 2. The D.C. voltage input to resistor 12 is applied across nodes 1 and 4, and may be produced by a variety of rectification circuits; as shown in FIG. 1, the filtered D.C. voltage across nodes 1 and 4 is generated by passing an A.C. source voltage through a rectifier 20, a surge limiter circuit 22 and a filter 24 connected in series between the A.C. source voltage and the resistor 12. The A.C. source voltage is provided by a three-wire input from the power source to rectifier 20; however, any other voltage supply means can be utilized. Filter 24 may be an R-C or L-C filter, or any other conventional filter suitable for power supply use at the required power levels.

A linear dissipative regulator (LDR) 11 is connected between node 1 and load 16 (node 3) in parallel with and bypassing the series-switched resistor 12, the parasitic inductor 13, and the switch 14. The linear dissipative regulator 11 provides an alternate current path to the load which bypasses resistor 12 when the duty cycle of the switch 14 is 100%. The design of the LDR 11 is described in more detail below in connection with the description of FIG. 5.

The SRR 10 operates by opening and closing switch 14 repetitively with a varying duty cycle; the switching frequency is constant, but the duty cycle of switch 14 is variable and is controlled by a duty cycle controller 15. The duty cycles is controlled to vary the average current through the resistor 12 so as to maintain an average current at a user-controlled level through the load 16 (or to establish a user-controlled voltage across the load). The duty cycle controller 15 is available commercially as an integrated circuit and serves to compare the power being delivered to the load to the desired power. The power to the load is sensed via a line 17 which symbolizes sensing of current through the load 16 and- /or the voltage across the load from node 3 to node 4. Desired power is determined from a user input signal on line 19. The difference between the actual power and the desired power is used to set the duty cycle via a line 21 which is coupled to the base of the switching transistor 14. In the case where the switching transistor 14 is an FET, line 21 would be coupled to the gate.

The duty cycle controller 19 is also coupled to a linear dissipative regulator 11 by a control signal on a line 23. When the duty cycle is 100%, the signal on the line 23 is activated to turn LDR 11 on to bypass the SRR. The switching frequency of the duty cycle controller 15 is sufficiently high so that capacitor 18 remains sufficiently charged to provide a current through the load 16 when switch 14 is open. When current to the load is to be increased, the switch 14 is closed for longer intervals, i.e., the duty cycle is increased.

The operation and purpose of the LDR is as follows. When the duty cycle of switch 14 reaches 100%, the switch is always closed, and no further current regulation can take place. At such a time, the apparent resistance through the SRR is at its lowest. When the apparent resistance to the load is at its minimum value, it is equal to the resistance of resistor 12. The voltage drop across resistor 12 when the duty cycle is 100% prevents the full source voltage at the output of the filter 24 from being applied to the load per Kirchoff's voltage law. The voltage drop across the SRR (from node 1 to node 2) will be lower for lower values of resistor 12, but lowering the resistance of the resistor 12 too much may increase current flow through switch 14 to a value which destroys it. To insure that the full source voltage can be applied to the load, LDR 11 is used to shunt current around the SRR to the load without passing through resistor 12 under such circumstances, thereby decreasing the voltage drop across the SRR and maximizing power delivery to the load. The LDR 11 is controlled by the signal on line 23 to turn on this current shunt path as the duty cycle of switch 14 reaches 100%.

The series-switched resistor regulator 10 provides constant load current for a given desired power level as determined by the user input signal on line 19 despite varying A.C. input line voltage.

High peak switching current through the switch 14 may occur when the duty cycle is low and the voltage drop across the SRR is high. Of course, the maximum peak current depends upon the input line voltage and the resistance 12 and the load 16. The switch 14 should have a maximum current handling capability of approximately 2-10 times the load current to withstand these peak currents. Peak currents may also produce high ripple current in capacitor 18. Multiphase switching operation using multiple SRRs may be used to reduce ripple current in the capacitor.

Because the switched resistor 12 in high-power supplies is generally a low-resistance, wire-wound resistor, the resistor 12 will have associated with it a parasitic inductance 13. Because this inductance is in series with the switch 14, each time the switch 14 attempts to interrupt current flow through the parasitic inductor 13, a high-voltage transient is generated. This voltage transient tends to drive the voltage at node 2 toward positive infinity relative to node 4. This high voltage at node 2 could destroy the switch 14 if the energy stored in the magnetic field of the parasitic inductor 13 is not dissipated.

To remedy this problem, a diode snubber 25 is coupled across the switched resistor 12 and the parasitic inductance 13. Specifically, the anode of the diode 25 is coupled to node 2 and the cathode is coupled to node 1. When the voltage on node 2 rises one forward biased diode voltage drop above the voltage on the node 1 during the voltage transient, the diode begins to conduct. This conduction shunts the energy stored in magnetic field of the parasitic inductor away from the switch 14, thereby preventing this energy from being dissipated in the switch 14 and destroying it.

It is conventionally understood by those skilled in the art that a diode cannot be coupled across a pure inductor as a snubber. The voltage across an inductor is equal to L di/dt and the average voltages across an inductor must be zero. Because of the voltage drop across the diode, L di/dt cannot be zero when the diode is forward biased or reverse biased. The diode must be in one of these states at all times. Thus, the average voltage across the inductor cannot be zero as it must be unless L di/dt is non-zero. If L di/dt is non-zero, the current in the inductor would constantly be changing and could rise to infinity during long intervals of either a reverse biased or forward biased condition. Since this cannot happen, those skilled in the art have heretofore avoided such an arrangement.

However, the applicant realized that since there is a resistor in series with the parasitic inductor, the voltage drop across the resistor changes the situation such that a diode *can* be used as a snubber with no ill effects. This allows a structure according to the teachings of the invention to be built and to work.

Figure 2:
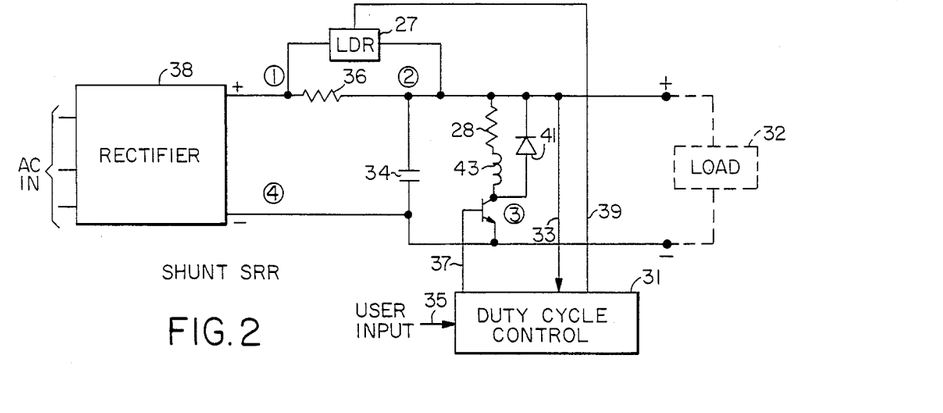
FIG. 2 is a schematic/block diagram of a shunt-switched resistor regulator with linear dissipative regulator and with a diode snubber.

A shunt-switched resistor regulator 26, as shown in FIG. 2, has a shunt-switched resistor 28 and switch 30 connected in parallel across a load 32, i.e., from node 2 to node 4. Also connected across load 32 and in parallel with the series combination resistor 28 and switch 30 is a capacitor 34. A.C. input voltage is passed through rectifier 38, and the D.C. output voltage therefrom is coupled across nodes 1 and 4. Node 1 is coupled to a fixed resistor 36 which limits the maximum current level. This resistor 36 is connected in series with the load via node 2. Resistor 28 and switch 30 are coupled between node 2 and the negative D.C. output voltage terminal which has been designated node 4 in FIG. 2. The circuit of FIG. 2 operates by repetitively opening and closing switch 30 to add or remove the shunt current path through the resistor 28. This shunt current path is added to or removed from the circuit for varying amounts of time, depending upon the desired current level through the load. When the resistor 28 is removed from the circuit (switch 30 open), more current flows to the load 32; when switch 30 closes, current is divided between resistor 28 and load 32. The amount of current sharing depends upon the relative values of the resistances of the resistor 23 and the load 32 and upon the duty cycle of the switch 30. The duty cycle of switch 30 is controlled by a conventional duty cycle control circuit 31 to provide proper regulation of the current through the load 32.

The duty cycle controller 31 is commercially available as an integrated circuit. The duty cycle controller 31 is coupled to the output terminal node 2 by line 33. The line 33 symbolizes sensing of the voltage across the load and/or the current flowing through the load. This information is compared to the desired power to the load as set by a user input signal on line 35. The difference between the actual power being delivered to the load and the desired power is converted into an error signal that is used to make an appropriate adjustment in the duty cycle via the transistor base control signal on line 37.

Resistor 36 is always in series with load 32 to limit the maximum current to the load 32 when the duty cycle is 0%. Capacitor 34 and resistor 36 form an R-C filter to filter the rectified signal from rectifier 38.

A linear dissipative regulator (LDR) 27 is connected across series resistor 36. LDR 27 is controlled by a signal from the duty cycle controller 31 on line 39 to decrease the minimum voltage drop across resistor 36 by shunting part of the current around the resistor 36 when the duty cycle is 0%.

In a shunt-switched resistor regulator such as the circuit shown in FIG. 2, peak switching current is approximately half the operating current for fixed current operation. No L-C filter or surge limiting is required as in the series-switched regulator of FIG. 1, and lower conducted emissions are produced. However, the efficiency of the shunt-switched resistor regulator is lower than the series-switched regulator, particularly for wide current control range and input line current changes with input line voltage.

A diode snubber 41 is coupled between nodes 3 and 2 with the anode coupled to node 3. This snubber serves the same purpose as the diode snubber 21 in the embodiment of FIG. 1. That is, the diode 41 dissipates the energy stored in the parasitic inductor 43. These voltage transients result from interruption by the switch 30 of current flowing through the parasitic inductor 43.

Figure 3:
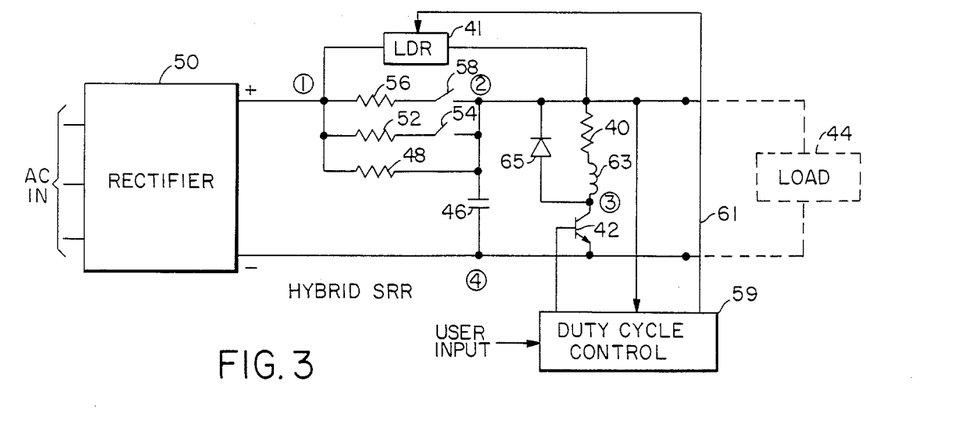
FIG. 3 is a schematic/block diagram of a hybrid switched resistor regulator with a linear dissipative regulator and with a diode snubber.

A hybrid-switched resistor regulator is shown in FIG. 3. This embodiment combines a shunt-switched resistor 40 with selectable series resistors 56 and 52. The shunt resistor 40 and series switch 42 are connected across load 44 from node 2 to node 4. A capacitor 46 is also connected in parallel with the load from nodes 2 to 4. Load 44 is also connected through a series resistor 48 to a rectifier 50 which supplies a rectified D.C. voltage signal to the load 44. The resistor 48 is coupled from nodes 1 to 2. A first series resistor 52 and its series switch 54 are connected in series between rectifier 50 and load 44, and in parallel with resistor 48 (between nodes 1 and 2). A second series resistor 56 and its series switch 58 are also connected in series between rectifier 50 and load 44 and in parallel with the resistor 48 (between nodes 1 and 2). The purpose of the first and second series-switched resistors 52 and 56 is to provide a means by which the current level to the load may be selected by control of the switches 54 and 58.

In operation, resistor 40 is switched in and out of the circuit as a shunt-switched resistor regulator to provide desired current regulation through load 44. The switching duty cycle of the switch 42 is controlled by a conventional duty cycle controller 59 which works in the same way as the duty cycle controller 31 in FIG. 2. The series resistors 52 and 56 are used, in combination with resistor 48, to select the "rouqh" current level supplied to the load 44 and to get within a "fine-tuning" range of the shunt SRR resistor 40. By adding either or both of resistors 52 and 56 in parallel to resistor 48, the total resistance from nodes 1 to 2 is decreased. This will cause the current level to the load to be increased. Switches 54 and 58 are not the same type of switches as switch 42 since their functions are totally different; switch 42 is used for rapid switching of resistor 40 with a controlled duty cycle to provide "fine tuning" current regulation through the load. Switches 54 and 58 are only used to change the total series resistance between nodes 1 and 2 on a large scale to cause large, fixed changes in the amplitude of current through the load. By switching the series resistors 52 and 56 only when necessary to change the "coarse" current level to the load, the switch 42 and resistor 40 need do less work in regulating the current to the load. This reduces conducted emissions and capacitor ripple problems and eliminates the need for a filter and surge-limiting circuit. The load current also tends to remain level. The capacitor 46 remains substantially charged during the switching and forms an R-C filter with resistor 48 between rectifier 50 and load 44. A linear dissipative regulator (LDR) 41 may also be connected between rectifier 50 and load 44 in parallel with resistors 48, 52, and 56 (between nodes 1 and 2). This LDR is controlled by a signal on line 61 from the duty cycle controller 59 to reduce the resistance between the nodes 1 and 2 when the duty cycle becomes 0%. This creates a low resistance shunt current path between nodes 1 and 2 thereby reducing the wasted power in the resistance coupled between nodes 1 and 2 during intervals when maximum power is to be delivered to the load.

A diode snubber 65 having its anode coupled to node 3 and its cathode coupled to node 2 serves to snub voltage transients in a parasitic inductance 63 associated with the resistor 40.

Figure 4:
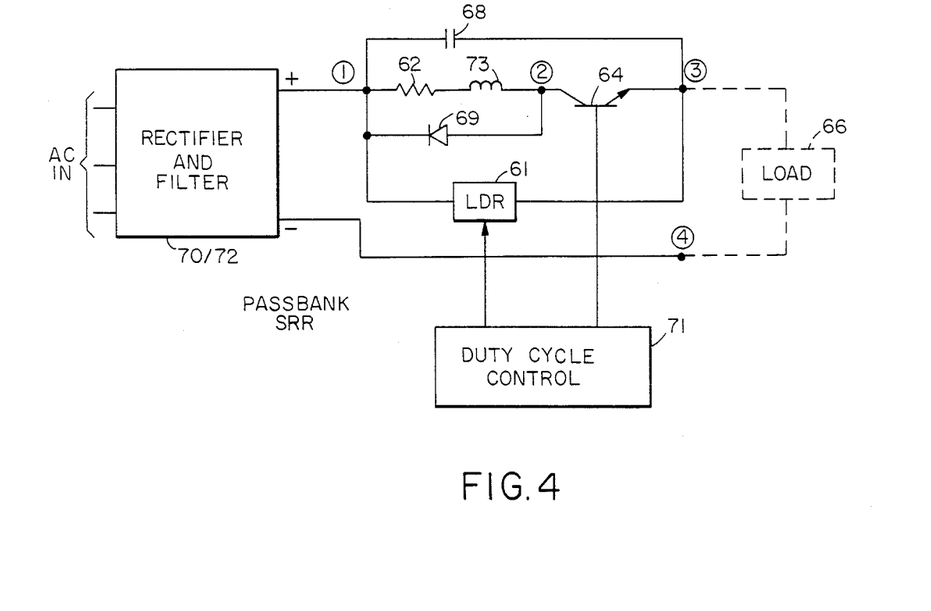
FIG. 4 is a schematic/block diagram of a switched resistor passbank regulator with a linear dissipative regulator and with a diode snubber.

A switched resistor passbank regulator is shown in FIG. 4. This embodiment utilizes a resistor 62 and a switch 64 connected in series with a load 66. A capacitor 68 is connected across the resistor 62 and switch 64 from nodes 1 to 3 and functions to maintain current flow through the load 66 when switch 64 is open. A D.C. input voltage is provided by a rectifier 70. The D.C. voltage may be filtered by filter 72. The filter may be an L-C or an R-C filter.

In operation, the duty cycle of switch 64 is controlled to vary the current through resistor 62, thereby regulating the current and voltage to the load 66. Since capacitor 68 i in series with load 66 and gas discharge tube loads have a fairly high minimum operating voltage, a lower voltage capacitor can be used for capacitor 68 than the parallel capacitor used in the series-switched regulator of FIG. 1 since only the difference between the source voltage and the load voltage appears across the capacitor. The passbank configuration of FIG. 4 also produces low conducted emissions and constant A.C. line current since switched-resistor current does not go back to the A.C. source.

A linear dissipative regulator (LDR) 61 is also connected between nodes 1 and 3 in parallel with a switched resistor passbank regulator. This decreases the minimum voltage drop from nodes 1 to 3 when switch 64 is in a constant closed position during 100% duty cycle intervals.

A diode snubber 69 has its anode coupled to node 2 and its cathode coupled to node 1. This snubber works in the same way as the diode snubbers in the embodiments of FIGS. 1-3 to snub voltage transients that result when current passes through the parasitic inductance 73 of the resistor 62.

A duty cycle controller 71 controls the duty cycle of the transistor 74 in a conventional manner.

Although various types of switches can be utilized for the circuits of FIGS. 1-4, the switches 14, 30, 42, and 64 are preferably power transistors, of either the bipolar of MOS variety. Gate turnoff thyristors could also be used as well as SCRs or even electromechanical switches. Each switch is preferably operated at a frequency that produces low losses; a typical frequency is 20 kHz. The duty cycle controllers provide a pulse width modulated input to the base (or gate) of the controlled switching transistor. The duty cycle control circuitry may be implemented with commercially available integrated circuits.

The linear dissipative regulators may be bipolar transistors, MOSFETs, vacuum tubes or other devices which can form a switchable current shunt. Although the invention can be used in power supplies for many applications, the switched-resistor regulators are particularly useful for nearly constant voltage loads, e.g., discharge or arc lamps or ion laser tubes. Thus, the invention can be utilized in a power supply for lasers, specifically ion lasers or YAG lasers. In a switched-resistor regulator power supply for ion lasers, wire-wound immersion heaters for hot water heaters may be used as the resistors 12, 28, 40, and 62 in order to dissipate the heat which results. The heat may be removed by water cooling. Motor control transistors may be used for the switches 14, 30, 42, and 64.

Figure 5:
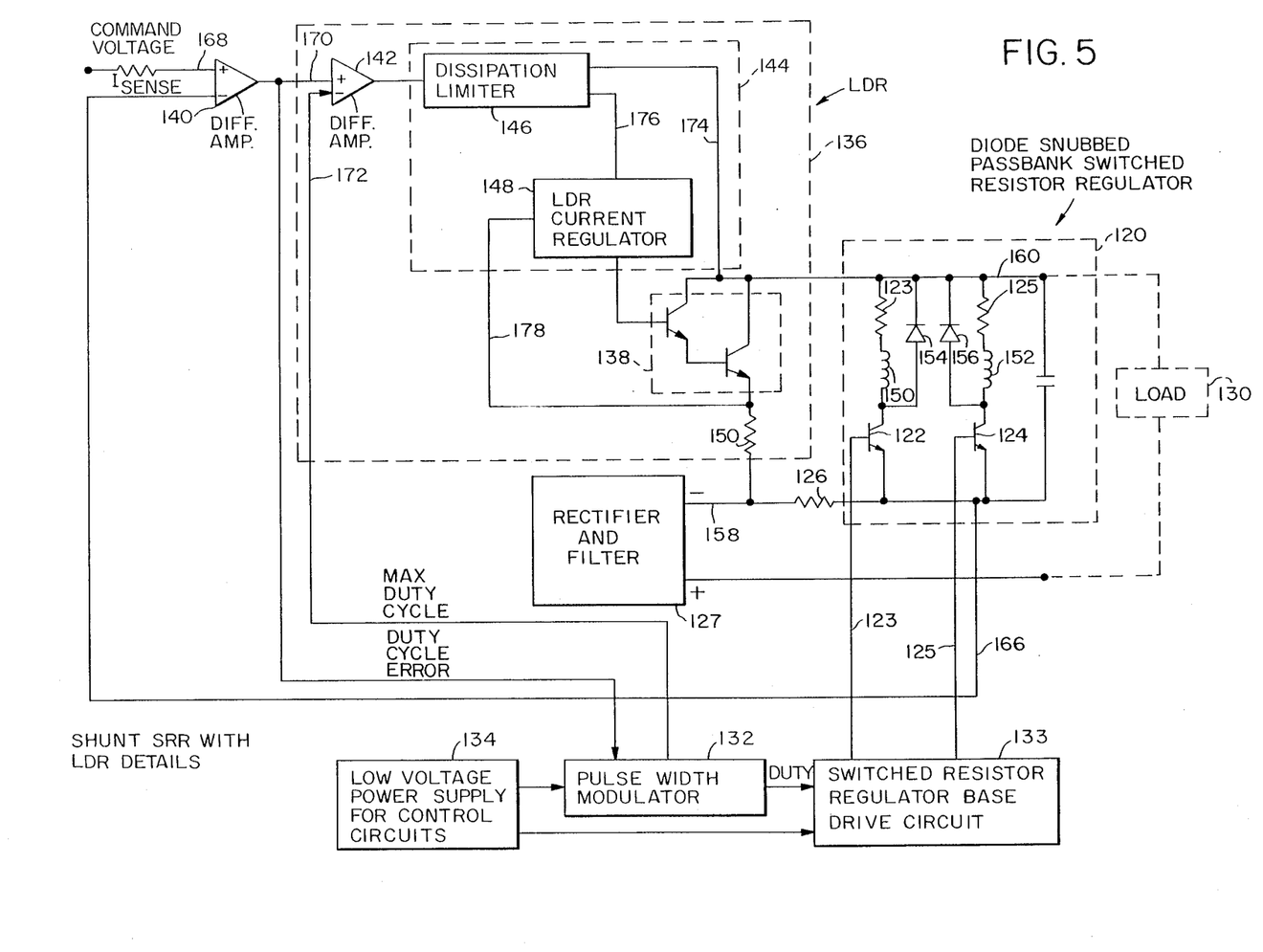
FIG. 5 is a detailed schematic of a passbank-switched resistor regulator showing the details of a linear dissipative regulator for an ion laser power supply and with a diode snubber.

An embodiment of a passbank-switched resistor regulator with linear dissipative regulator and diode snubbers is illustrated in FIG. 5. The basic configuration and operation of the switched-resistor regulator is described in U.S. patent application Ser. No. 754,036, filed July 11, 1985, which is herein incorporated by reference.

The following description shows how the linear dissipative regulator and diode snubbers may be added to such a circuit for improved operation. A passbank-switched regulator 120 includes a pair of transistors 122 and 124 which are connected at their collectors to a pair of switching resistors 123 and 125, each of which has an associated parasitic inductance 150 and 152, respectively. Each of the resistor/inductor combinations, 123/150 and 125/152, has a diode snubber, 154 and 156, respectively. These diode snubbers are coupled in parallel to the resistor/inductor combinations. The pair of switches 122 and 124 are used in place of a single switch for multiphase switching regulation to reduce ripple current. The emitters of the switching transistors are connected through current-sensing resistor 126 to the negative terminal of a D.C. voltage source/filter 127. A load 130 such as a laser tube is coupled to the positive terminal of the rectifier/filter 127 and to switched resistors 123 and 125 to complete the circuit. In this configuration, the load current must flow through the passbank SRR to reach the load 130.

The bases of the switching transistors 122 and 124 are driven by base drive circuit 133 which is connected to the bases of transistors 122 and 124 by lines 123 and 125, respectively. Base drive circuit 133 is controlled by a pulse width modulation (PWM) circuit 132 which is powered by a floating low voltage control supply 134. Any conventional design for these circuits will suffice for purposes of practicing the invention.

A linear dissipative regulator 136 is connected between the negative terminal 158 of the rectifier/filter 127 and load terminal 160 to provide a parallel current shunt path around the switched-resistor regulator 120. The LDR is formed of a Darlington pair transistor 138. A control circuit 144 is connected to the base of the Darlington pair 138 to control the resistance presented by the Darlington pair 138 between the line 160 and the line 158.

Load current through the load 130 is measured by the voltage drop across the resistor 126. The voltage at the emitters of the switching transistors is coupled via line 166 to a differential amplifier 140 and is compared there with a user-defined load current established by a command voltage on a line 168. This user input is coupled to one input of the difference amplifier 140. The other input of the difference amplifier 140 is coupled to the line 166. The error signal output from the amplifier 140 on a line 170 is input to PWM circuit 132 as a control signal. This signal is compared with a MAXIMUM DUTY CYCLE signal on a line 172 from pulse width modulator circuit 132 (hereafter PWM circuit) in a difference amplifier 142. The signal on line 172 from PWM circuit 132 indicates when the end of the range of the PWM circuit 132 is reached which indicates maximum power is to be delivered to the load. The output from the amplifier 142 is input into dissipation limiter circuit 146 along with a regulator voltage signal on a line 174 from load terminal 160. The dissipation limiter circuit 146 serves to determine if the power dissipation rating of Darlington pair 138 will be exceeded.

The output of the limiter circuit 146 on line 176 is a base drive signal for the Darlington pair. This signal is input to an LDR current regulator 148 along with a current signal on a line 178 from LDR 136 measured at a sensing resistor 150. LDR current regulator 148 is connected to the base of Darlington pair transistor 138 to actuate the linear dissipative regulator 136 and to control the amount of current flow through the LDR 136. It also controls the amount of current flow through the LDR 136 when the duty cycle is 100%

The diode snubbers 154 and 156 function in the same way as the diode snubbers in the embodiments of FIGS. 1-4. The diode snubbers serve to snub voltage transients which are generated in the parasitic inductances 150 and 152 associated with the resistors 123 and 125 to prevent damage to the switching transistor 122 and 124.

Changes and modifications in the specifically described embodiments can be carried out without departing from the scope of the invention, which is intended to be limited only by the scope of the appended claims.

What is claimed is:

1. A shunt switched resistor regulator power supply for supplying a variable amount of power to a load comprising:
   a rectifier means for accepting AC input voltage and converting it to DC output voltage at a positive and a negative terminal;
   first, second, third, and fourth nodes wherein said first and said fourth nodes are coupled to said positive and negative terminals, respectively;
   a current limiting resistor coupled between said first and second nodes;
   a capacitor coupled between said second and fourth nodes;
   a resistor having parasitic inductance coupled between said second and third nodes;
   a switch coupled between said third and fourth nodes; and
   a diode having its anode coupled to said third node and having its cathode coupled to said second node;
   means coupled to said load terminals for sensing the power being delivered to said load and for controlling said switch to have a duty cycle which results in the desired load current flowing through and a desired voltage appearing across said load in accordance with control input signals received at a control input.

2. A hybrid switched resistor regulator power supply for delivering a variable amount of power to a load comprising:
   a rectifier means for accepting AC input voltage and converting it to DC output voltage at a positive and a negative terminal;
   first, second, third, and fourth nodes wherein said first and said fourth nodes are coupled to said positive and negative terminals, respectively;
   a current limiting resistor coupled between said first and second nodes;
   means coupled between said first and said second nodes for selectively lowering the resistance between said first and second nodes when said power supply is to deliver more power to said load;
   a capacitor coupled between said second and fourth nodes;
   a resistor having parasitic inductance coupled between said second and third nodes;
   a switch coupled between said third and fourth nodes; and
   a diode having its anode coupled to said third node and having its cathode coupled to said second node;
   said third and fourth nodes being load terminals to which a load may be coupled;
   means coupled to said load terminals for sensing the power being delivered to said load and for controlling said switch to have a duty cycle which results in the desired load current flowing through and a desired voltage appearing across any said load coupled to said third and fourth nodes in accordance with control input signals received at a control input.

3. The apparatus of claim 1 wherein said resistor having parasitic inductance is a wire wound resistor and wherein said switch is a transistor, and further comprising current shunt means coupled between said second and fourth nodes for providing a low resistance path for current flow between these nodes to reduce the voltage drop between these nodes lower than it would otherwise be absent said current shunt means when the duty cycle of said switch is substantially near 100% and said switch is on substantially all the time.

4. The apparatus of claim 2 wherein said resistor having parasitic inductance is a wire wound resistor and wherein said switch is a transistor, and further comprising current shunt means coupled between said first and second nodes for providing a low resistance path for current flow between these nodes to reduce the voltage drop between these nodes lower than it would otherwise be absent said current shunt means when the duty cycle of said switch is substantially near 100% and said switch is on substantially all the time.

5. A method of operation of a power supply having a switched resistor regulator having a switch and a switched resistor coupled to a load to control the power delivered thereto comprising the steps of:
   sensing the desired level of power to be delivered to a load from a used input;
   sensing the actual power being delivered to the load;
   generating a duty cycle control signal based upon the error between the actual power being delivered to the load and the desired power and coupling it to said switched resistor regulator so that more or less power is delivered to said load; and
   snubbing the voltage transients which occur across the parasitic inductance associated with the switched resistor in the switched resistor regulator using a diode coupled to said switch and across said switched resistor in the polarity such that the resulting voltage transient forward biases the diode.

6. A shunt switched resistor regulator comprising:
   a power source for supplying D.C. voltage;
   load terminals for coupling to a load;
   a means coupled between said power source and said load terminals for limiting current flow through any load coupled to said load terminals;
   power dissipation control means coupled across said load and responsive to a user input signal for controlling a variable amount of shunt current flow therethrough in accordance with a characteristic of said user input signal to control the power dissipation in the load, said power dissipation control means including a resistor having a parasitic inductance which is part of said resistor and a diode snubber coupled in parallel across said resistor with a polarity so as to conduct whenever a back electromotive force voltage transient arises in said parasitic inductance.

7. An apparatus as defined in claim 6 further comprising a load capacitor coupled in parallel across said load terminals and means coupled to said power dissipation control means for providing a shunt current path of substantially zero resistance from said power source to said load terminal when said power dissipation control means is causing maximum power to be delivered to said load terminals.

8. A hybrid switched resistor regulator comprising:
   a power source for supplying D.C. voltage;
   load terminals for coupling to a load;
   means coupled between said power source and said load terminals for controlling the maximum amount of current that can flow through said load at any of several user selectable levels;
   power dissipation control means coupled across said load terminals and responsive to a user input signal for controlling a variable amount of shunt current flow therethrough in accordance with a characteristic of said user input signal to control the power dissipation in the load, said power dissipation control means including a resistor having a parasitic inductance which is part of said resistor and a diode snubber coupled in parallel across said resistor with a polarity so as to conduct whenever a back electromotive force voltage transient arises in said parasitic inductance.

9. The apparatus of claim 8 further comprising a load capacitor coupled across said load terminals and means coupled to said power dissipation control means for providing a shunt current path of substantially zero resistance from said power source to said load terminals when said power dissipation control means is causing maximum power to be delivered to said load terminals.

10. A power supply comprising:
    a rectifier;
    a pair of load terminals for coupling to a load;
    a resistor having parasitic inductance coupled to said rectifier and to said load terminals;
    switching means coupled to said resistor and having a control input for receiving a control signal indicating the desired power level to be dissipated in any said load coupled to said load terminals for switching current through said resistor in a manner so as to cause the amount of power dissipated in any said load to be in accordance with the desired power level; and a diode coupled across said resistor to shunt voltage transients in said parasitic inductance when current flow is shut off.

11. A method of operating a power supply comprising:

sensing the desired level of power to be delivered to a load from a control signal;

switching current flowing through a resistor having parasitic inductance coupled to the load in such a manner that the power delivered to the load is in accordance with the desired power level; and shunting current from the collapsing magnetic field associated with said parasitic inductance when current through said parasitic inductance and resistor is cut off through a diode.

12. A method of operating a power supply as defined in claim 11 further comprising the steps of:

sensing the actual power being delivered to the load;

comparing the actual power being delivered to the load to the desired power; and adjusting the switching of current through said resistor to cause the desired level of power to be delivered to said load.

13. A method of operating a power supply comprising:

switching current through a resistor with a duty cycle calculated to deliver a user defined amount of power to the load; and shunting current from voltage transients across the parasitic inductance associated with said resistor and resulting from said switching around said resistor using a diode.

14. The method of claim 13 further comprising the steps of:

sensing the desired level of power to be delivered to said load;

sensing the actual level of power being delivered to said load;

generating an error signal;

using said error signal to make the necessary change in switching duty cycle of current switching through said resistor to adjust the actual power being delivered to said load to conform to the desired power to be delivered to said load.

15. The method of claim 14 further comprising the steps of limiting the maximum amount of current to be delivered to said load to some maximum with a current limiting device, but bypassing the current limiting device with a low resistance path during intervals when maximum power is to be delivered to said load.

* * * * *